United States Patent
Green

(10) Patent No.: US 11,649,049 B2
(45) Date of Patent: May 16, 2023

(54) UNMANNED COAXIAL ROTOR AERIAL VEHICLE FOR TRANSPORT OF HEAVY LOADS

(71) Applicant: Justin Wesley Green, Iola, TX (US)

(72) Inventor: Justin Wesley Green, Iola, TX (US)

(*) Notice: Subject to any disclaimer, the term of this patent is extended or adjusted under 35 U.S.C. 154(b) by 463 days.

(21) Appl. No.: 16/453,136

(22) Filed: Jun. 26, 2019

(65) Prior Publication Data

US 2020/0331603 A1 Oct. 22, 2020

Related U.S. Application Data

(60) Provisional application No. 62/691,033, filed on Jun. 28, 2018.

(51) Int. Cl.
| | | |
|---|---|---|
| *B64C 39/02* | (2023.01) | |
| *B64C 27/10* | (2023.01) | |
| *B64D 9/00* | (2006.01) | |
| *B64D 27/10* | (2006.01) | |
| *B64D 27/24* | (2006.01) | |
| *B64D 27/26* | (2006.01) | |
| *B64U 10/10* | (2023.01) | |
| *B64U 30/20* | (2023.01) | |

(Continued)

(52) U.S. Cl.
CPC ............ *B64C 39/024* (2013.01); *B64C 27/10* (2013.01); *B64D 9/00* (2013.01); *B64D 27/10* (2013.01); *B64D 27/24* (2013.01); *B64D 27/26* (2013.01); *B64U 10/10* (2023.01); *B64U 30/20* (2023.01); *B64U 50/19* (2023.01); *B64U 2101/60* (2023.01); *B64U 2201/10* (2023.01)

(58) Field of Classification Search
CPC ........ B64C 2201/024; B64C 2201/042; B64C 2201/108; B64C 2201/128; B64C 27/141; B64C 27/145; B64C 27/10; B64C 27/08; B64C 39/024; B64D 1/22; B64D 27/10; B64D 27/24; B64D 27/26; B64D 9/00; B64U 10/10; B64U 30/20; B64U 50/19; B64U 2101/60; B64U 2201/10

See application file for complete search history.

(56) References Cited

U.S. PATENT DOCUMENTS

| | | | | |
|---|---|---|---|---|
| 2,847,173 A | * | 8/1958 | McCarty, Jr. | ......... B64C 39/026 244/17.11 |
| 3,223,358 A | * | 12/1965 | Quick | ..................... B64C 27/20 244/17.17 |

(Continued)

FOREIGN PATENT DOCUMENTS

JP 2001-039397 2/2001

OTHER PUBLICATIONS

International Search Report and Written Opinion issued in co-related International Application No. PCT/2019/039511 dated Feb. 25, 2020.

(Continued)

*Primary Examiner* — Medhat Badawi
(74) *Attorney, Agent, or Firm* — Hogan Lovells US LLP

(57) ABSTRACT

An unmanned aerial vehicle (UAV) for transporting items between locations includes a frame and a propulsion system coupled to the frame, the propulsion system including at least one transmission and at least one motor. The UAV also includes a load support area of the frame, the load support area comprising at least one of a different material than the frame or structural supports.

20 Claims, 8 Drawing Sheets

(51) Int. Cl.
*B64U 50/19* (2023.01)
*B64U 101/60* (2023.01)

(56) References Cited

U.S. PATENT DOCUMENTS

| | | | | |
|---|---|---|---|---|
| 3,510,107 A * | 5/1970 | Fidler | B66C 13/23 | 244/137.4 |
| 3,721,405 A * | 3/1973 | Jackson | B64C 27/14 | 244/17.21 |
| 3,904,156 A * | 9/1975 | Smith | B64D 1/22 | 244/3 |
| 3,907,219 A * | 9/1975 | Pharris | B64C 27/26 | 244/12.5 |
| 3,971,535 A * | 7/1976 | Jones | B64C 3/40 | 244/46 |
| 4,123,018 A * | 10/1978 | Tassin de Montaigu | B64C 29/02 | 244/17.23 |
| 4,163,535 A * | 8/1979 | Austin | B64C 39/024 | 244/17.11 |
| 4,267,987 A * | 5/1981 | McDonnell | B64D 39/00 | 244/6 |
| 4,478,379 A * | 10/1984 | Kerr | B64C 39/024 | 244/17.11 |
| 5,190,250 A * | 3/1993 | DeLong | B64D 1/22 | 244/17.11 |
| 5,370,341 A * | 12/1994 | Leon | B64C 31/028 | 244/17.11 |
| 7,789,341 B2 * | 9/2010 | Ariton | B64C 39/024 | 244/6 |
| 7,946,530 B1 * | 5/2011 | Talmage, Jr. | B64C 39/02 | 244/140 |
| 8,083,173 B2 * | 12/2011 | Ariton | B64C 39/024 | 244/17.23 |
| D713,321 S * | 9/2014 | Cummings | D12/326 | |
| 9,079,662 B1 * | 7/2015 | Duffy | B64D 1/22 | |
| 9,321,531 B1 * | 4/2016 | Takayama | B64C 39/02 | |
| 9,422,139 B1 * | 8/2016 | Bialkowski | B64C 39/024 | |
| 9,517,838 B1 * | 12/2016 | Howard | B64C 27/12 | |
| 9,676,481 B1 * | 6/2017 | Buchmueller | B64D 1/22 | |
| 9,718,547 B2 * | 8/2017 | Lesperance | G05D 1/102 | |
| 9,751,619 B1 | 9/2017 | Howard | | |
| 10,180,687 B2 * | 1/2019 | Vander Lind | B64D 3/00 | |
| 10,301,020 B2 * | 5/2019 | Jones | B64C 39/024 | |
| 10,336,453 B2 * | 7/2019 | Chan | B64C 39/024 | |
| 10,336,543 B1 * | 7/2019 | Sills | G05D 1/0027 | |
| 10,993,569 B2 * | 5/2021 | Gil | B64C 39/024 | |
| 11,027,843 B2 * | 6/2021 | Prager | G05D 1/101 | |
| 11,029,705 B2 * | 6/2021 | Neubert | G05D 1/042 | |
| 11,053,006 B2 * | 7/2021 | Jones | B64C 39/024 | |
| 11,066,163 B2 * | 7/2021 | Kimchi | B64C 15/12 | |
| 2005/0236518 A1 * | 10/2005 | Scott | B64C 27/322 | 244/17.23 |
| 2006/0060694 A1 * | 3/2006 | Nonami | A63H 30/04 | 701/11 |
| 2007/0012818 A1 * | 1/2007 | Miyazawa | A63H 27/12 | 244/17.25 |
| 2009/0146010 A1 * | 6/2009 | Cohen | B64D 1/22 | 701/3 |
| 2010/0012769 A1 * | 1/2010 | Alber | B64C 39/02 | 244/17.23 |
| 2010/0084513 A1 * | 4/2010 | Gariepy | B64C 39/024 | 244/190 |
| 2010/0256839 A1 * | 10/2010 | Fitzpatrick | G05D 1/0858 | 244/175 |
| 2010/0280699 A1 * | 11/2010 | Bageshwar | G05D 1/0231 | 701/25 |
| 2011/0084162 A1 * | 4/2011 | Goossen | B64D 1/22 | 244/135 C |
| 2011/0315806 A1 * | 12/2011 | Piasecki | B64C 27/20 | 244/17.11 |
| 2012/0080556 A1 * | 4/2012 | Root, Jr. | B64F 1/06 | 73/170.28 |
| 2014/0032034 A1 * | 1/2014 | Raptopoulos | H04B 7/18506 | 701/25 |
| 2014/0217230 A1 * | 8/2014 | Helou, Jr. | B64C 39/024 | 244/17.17 |
| 2015/0063959 A1 * | 3/2015 | Saad | B60L 53/34 | 414/373 |
| 2015/0158576 A1 * | 6/2015 | Jones | B64C 39/024 | 701/2 |
| 2015/0158587 A1 * | 6/2015 | Patrick | B64D 1/12 | 701/3 |
| 2015/0175276 A1 * | 6/2015 | Koster | B64F 1/32 | 244/114 R |
| 2015/0217860 A1 * | 8/2015 | Yang | B64C 25/14 | 244/102 R |
| 2015/0331427 A1 * | 11/2015 | Chaudary | G05D 1/0858 | 701/4 |
| 2016/0001883 A1 * | 1/2016 | Sanz | B64C 39/024 | 244/17.23 |
| 2016/0059963 A1 * | 3/2016 | Burgess | B64D 9/00 | 701/49 |
| 2016/0068265 A1 * | 3/2016 | Hoareau | G06Q 10/083 | 701/3 |
| 2016/0083115 A1 * | 3/2016 | Hess | B64C 39/022 | 701/3 |
| 2016/0144982 A1 * | 5/2016 | Sugumaran | B64C 25/32 | 244/108 |
| 2016/0257423 A1 * | 9/2016 | Martin | B64C 39/024 | |
| 2017/0081028 A1 * | 3/2017 | Jones | B64C 39/024 | |
| 2017/0175413 A1 * | 6/2017 | Curlander | E04H 14/00 | |
| 2017/0197718 A1 * | 7/2017 | Buchmueller | B64C 17/00 | |
| 2017/0233070 A1 * | 8/2017 | Starace | G05D 1/0858 | 244/7 B |
| 2017/0247109 A1 * | 8/2017 | Buchmueller | B64C 39/024 | |
| 2017/0283052 A1 * | 10/2017 | Moshe | B64C 29/02 | |
| 2017/0313421 A1 * | 11/2017 | Gil | B64D 45/04 | |
| 2018/0141682 A1 * | 5/2018 | Blake | B64C 39/024 | |
| 2019/0248489 A1 * | 8/2019 | Jones | B64C 39/024 | |
| 2020/0331603 A1 * | 10/2020 | Green | B64C 39/024 | |

OTHER PUBLICATIONS

AU Examination Report dated Sep. 13, 2021 issued in AU Application Serial No. 2019340252.
EP Search Report dated Feb. 8, 2022 issued in EP Application Serial No. 19859481.4.
MX Office Action dated Mar. 2, 2021 issued in MX Application Serial No. MX/a/2020/013824.
CA Office Action dated Mar. 3, 2022 issued in Application Serial No. 3,103,979.
JP Office Action dated Oct. 4, 2022 issued in Application Serial No. 2020-0573476.
AU Notice of Allowance dated Sep. 1, 2022 in Application Serial No. 2019340252.

* cited by examiner

UNMANNED COAXIAL ROTOR AERIAL VEHICLE FOR TRANSPORT OF HEAVY LOADS

CROSS-REFERENCE TO RELATED APPLICATIONS

This application claims priority to, and the benefit of, co-pending U.S. Provisional Application Ser. No. 62/691,033 filed Jun. 28, 2018 titled "UNMANNED COAXIAL ROTOR AERIAL VEHICLE FOR TRANSPORT OF HEAVY LOADS" the full disclosure of which is hereby incorporated herein by reference in its entirety for all purposes.

BACKGROUND

1. Field of the Invention

The present disclosure relates in general to aerial vehicles, such as unmanned aerial vehicles (UAVs). In particular, the present disclosure relates to UAVs receiving and transporting heavy external loads.

2. Description of Related Art

Current heavy lift external operations are accomplished by aging manned conventional helicopters or heavy construction equipment, such as cranes. These methods, while functional, fail to provide performance in heavy lift capacity due to a number of drawbacks. For example, helicopters may suffer from technical problems, human occupancy, and various safety factors. Furthermore, helicopters with suspended loads may need to be visible from the cockpit, and as a result, support lines may have a limited length, which could lead to damage to structures since helicopters will be limited by the distance they can fly over various obstacles. Cranes and other lifting equipment also block roadways, cause property damage, be difficult to transport, and have high costs for seemingly minor operations.

SUMMARY

Applicants recognized the problems noted above herein and conceived and developed embodiments of systems and methods, according to the present disclosure, for UAV lifting systems.

In an embodiment, an unmanned aerial vehicle (UAV) for transporting items between locations includes a frame and a propulsion system coupled to the frame, the propulsion system including at least one transmission and at least one motor. The UAV also includes a load support area of the frame, the load support area comprising at least one of a different material than the frame or structural supports.

In another embodiment, a system for transporting an item from a first location to a second location includes an unmanned aerial vehicle (UAV). The UAV includes a frame, a propulsion system coupled to the frame, and a load support area of the frame, the load support area having at least one of a different material than the frame or structural supports. The system also includes a load coupled to the load support area. The system further includes a load positioning system. The load positioning system includes a load positioning controller, associated with the UAV, the load positioning controller determining a relative position of the load with respect to at least one of the UAV, the first location, or the second location. The load positioning system also includes a load location device, arranged proximate the load, the load location device transmitting a signal to the load positioning controller indicative of a load location. The load positioning system includes a placement location device, arranged at the second location, the placement location device transmitting a signal to the load positioning controller indicative of the second location relative to the UAV.

In an embodiment, a method for transporting an item between a first location and a second location includes securing the item to a load support area of an unmanned aerial vehicle (UAV). The method also includes activating a load location device, arranged proximate the item. The method further includes causing the UAV to move to the second location. The method also includes receiving a signal, from a placement location device, indicative of the second location. The method includes positioning the item at the second location.

BRIEF DESCRIPTION OF DRAWINGS

The present technology will be better understood on reading the following detailed description of non-limiting embodiments thereof, and on examining the accompanying drawings, in which.

DETAILED DESCRIPTION

Figure 1:
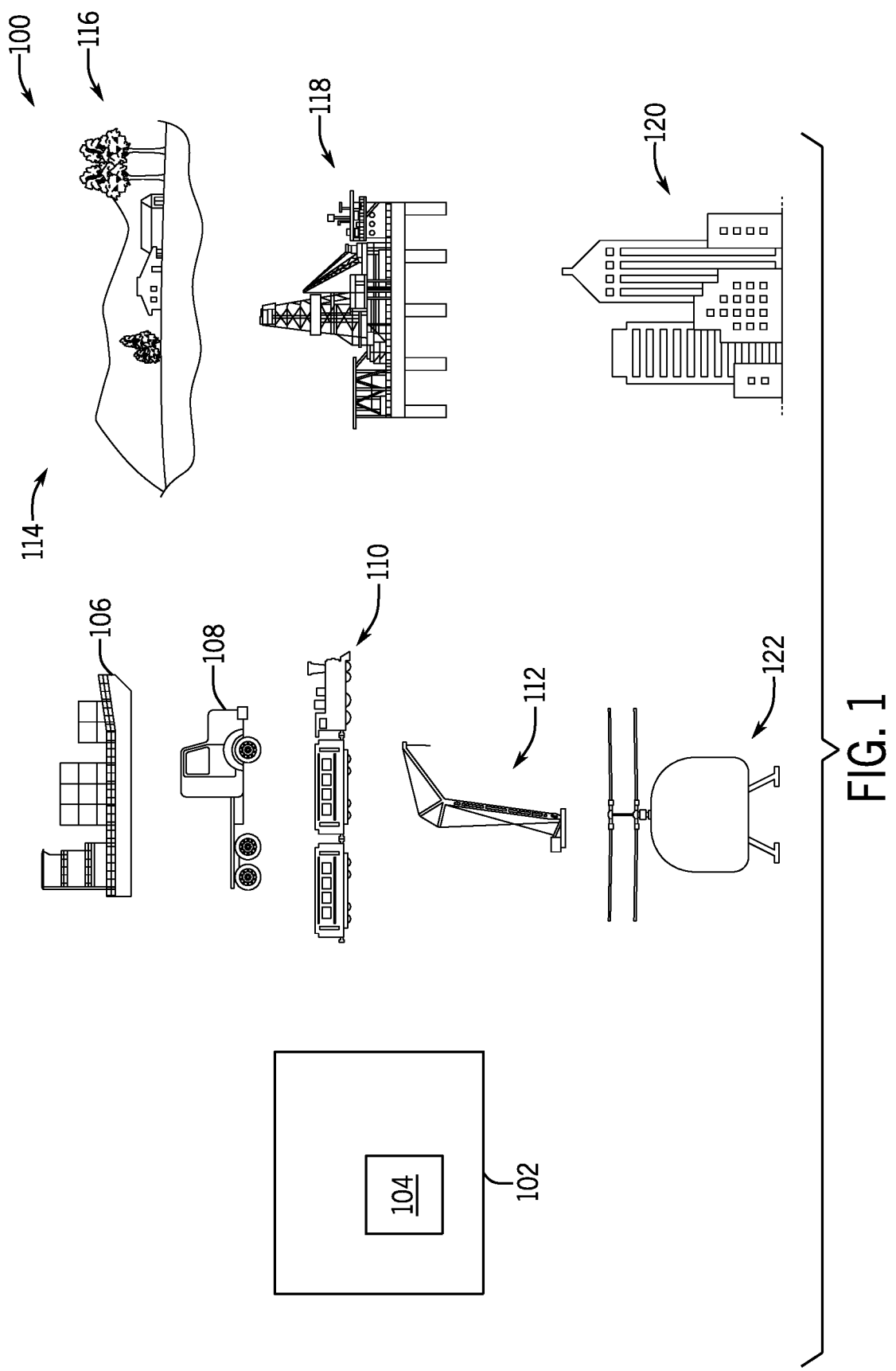
FIG. 1 is a schematic representation of an embodiment of a plurality of transport methods, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Like numbers may be used to refer to like elements throughout, but it should be appreciated that using like numbers is for convenience and clarity and not intended to limit embodiments of the present disclosure.

Embodiments of the present disclosure are directed toward systems and methods for utilizing aerial vehicles, such as UAVs, for heavy lift operations. In various embodiments, the UAVs may include reinforced frame structures, which may be separate from structures supporting operational equipment of the UAVs, as load attachment points. For example, a frame structure may include reinforcements, such as gussets, cross-braces, material modifications, and the like, to function as an anchor point for the attachment of a load, which may be suspended from the UAV during operation. In various embodiments, the frame structure may separate and/or remove the load from the transmission or motor of the UAV, thereby reducing stresses and also separating the load from critical components of the UAV. Furthermore, in embodiments, the load support area may further include features to facilitate coupling of the load such that loads may be quickly and efficiently coupled to the frame.

In various embodiments, systems and methods may also be directed toward utilizing a load location device and a placement location device to direct the loads to a particular location. For example, the UAVs may include one or more control systems, which may be referred to as an avionics component or a flight computer, that receives a signal from the placement location device. The placement location device may be a destination for the load supported by the UAV. As the UAV is directed toward the placement location device, the UAV may receive the signal and then navigate the load toward the placement location device. The load location device may enable the UAV to effectively determine a location of the UAV (e.g., a vertical distance higher than the placement location, an offset from the placement location, etc.) in order to navigate toward the placement location device. In various embodiments, such a system may enable delivery to remote locations and/or facilitate a staging or loading area for later transportation via one or more methods, such as additional UAVs, truck, rail, ship, or the like.

In various embodiments, systems and methods of the present disclosure may be used to provide heavy lift operations in a variety of different situations. For example, offshore platforms, such as those used for oil and gas exploration, may receive shipments of supplies and equipment utilizing UAVs. As a result, helicopter or shipping transportation to these locations may be reduced or eliminated. Furthermore, in embodiments, UAVs may be utilized to deliver items to rural locations, where other shipping methods may have difficulty traveling. For example, mountainous regions may not have roadways large enough to support trucks or the like, and as a result, many different shipments may be utilized to provide supplies and equipment. Embodiments of the present disclosure may utilize the UAVs to provide goods and equipment to these regions. Furthermore, in various embodiments, UAVs may be utilized with construction efforts in high-density areas, such as cities. During construction of buildings, such as high rises, cranes and the like may be utilized to lift items, such as air conditioning units and the like, to rooftop locations. These cranes may lead to road closures and may be cost-prohibitive. UAVs may be utilized to quickly and efficiently lift the items upward to rooftop locations without the same drawbacks as cranes and other lifting devices. Furthermore, embodiments of the present disclosure may be used for military operations to provide supplies to soldiers that may be in otherwise inaccessible or hostile regions. As a result, supply lines may be made available to these soldiers. Furthermore, the UAVs may be used to pick up operations, such as extraction missions, and also drop off operations, such as deployment. Additionally, in various embodiments, the UAVs of the present disclosure may be used during disaster or relief efforts. For example, UAVs may provide supplies and personnel to flooded regions where roadways are inaccessible due to high waters. Additionally, other natural disasters such as earthquakes, fires, and the like may also benefit from UAVs of the present disclosure where staging areas and supplies may be provided without traditional infrastructure in place.

It should be appreciated that while various embodiments of the present disclosure may describe UAVs, that in embodiments, other aerial vehicles may also be utilized. Moreover, UAVs may include aerial vehicles that are unmanned but are controlled by human operators. Furthermore, in various embodiments, an aerial vehicle that is manned and under human control may be converted into a UAV, in certain embodiments, such as by providing control to the UAV and/or having the human operator leave or otherwise exit the aerial vehicle.

FIG. 1 is a schematic plan view of an embodiment of an environment 100 in which embodiments of the present disclosure may be practiced. The illustrated environment 100 includes a loading area 102, which may be associated with a location where items may be prepared for delivery and/or transport. As will be understood, there are a variety of methods that may be utilized to transport an item 104 from a first location to a second location, such as ships 106, trucks 108, rail cars 110, and heavy equipment 112, such as cranes where the location is a substantially different vertical position, as opposed to a different horizontal position. A transport destination 114 may also vary, for example, such as rural areas 116, offshore platforms 118 or other water-based locations, and high-density areas 120, such as cities, among others. As will be appreciated, certain transportation methods may be preferable to others for various reasons. For example, rural areas 116 may not be accessible by ship 106. Similarly, trucks 108 are unable to delivery to offshore platforms 118. Accordingly, improved transportation methods are needed to facilitate transportation to a variety of different locations.

Embodiments of the present disclosure may include UAVs 122 to deliver the item 104 to various different transport destinations 114. UAVs 122 do not suffer from the same drawbacks as other methods, as they can access essentially any area. Furthermore, UAVs 122 can move items over long distances and also different vertical heights. As a result, the UAVs 122 may combine operations of various other transportation methods, such as acting as both a truck 108 and crane 112 at a transport destination 114. As noted above, helicopters may currently be used to deliver items to various different locations. However, UAVs 122 offer the benefit of being un-manned, thereby reducing risk associated with human operators conducting transport operations. For example, the UAVs 122 may be controlled, such as from a ground location, semi-autonomous, such as including partial control by a human operator, or fully autonomous. Additionally, UAVs 122 may be smaller and more cost effective than helicopters.

Figure 2:
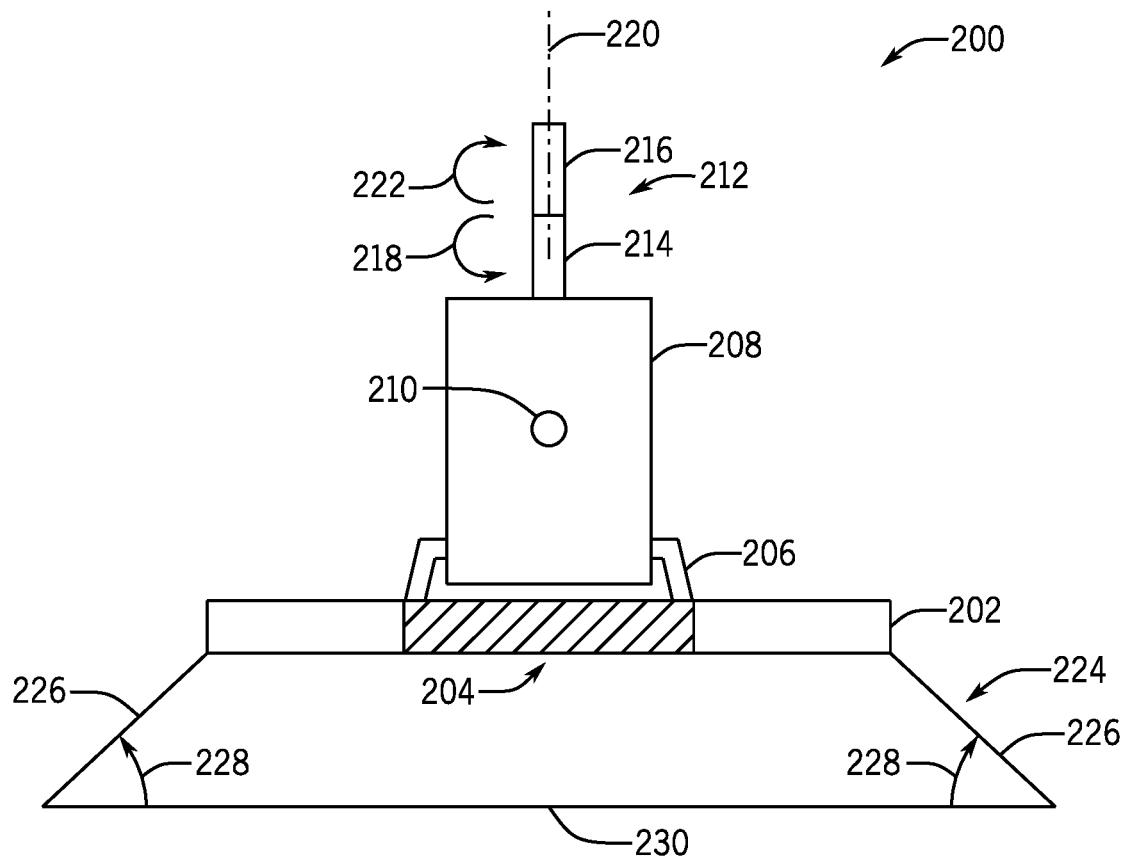
FIG. 2 is a schematic side view of an embodiment of an unmanned aerial vehicle (UAV), in accordance with embodiments of the present disclosure.

FIG. 2 is a side elevational view of an embodiment of a UAV 200, which may be used with embodiments of the present disclosure. It should be appreciated that various features have been removed for clarity with the following discussion. As described above, the UAV 200 may be manually controlled, for example by a human operator at a ground location, semi-autonomous, or fully autonomous. In various embodiments, the UAV 200 may not carry human passengers, but rather, cargo and the like. However, in various embodiments, the UAVs 200 may transport human passengers. The illustrated UAV 200 includes a frame 202. The frame 202 includes a load support area 204, which may be used to suspend or otherwise support various features of the UAV 200, such as a hanging load, other components of the UAV 200, or a combination thereof. Further illustrated is a transmission mount 206 that couples a transmission 208 to the frame 202, for example, to the load support area 204. It should be appreciated that, in various embodiments, the transmission mount 206 may not be coupled to the load support area 204. In other words, the transmission mount 206 may be coupled to the frame 202, but not directly to the load support area 204. The transmission 208 receives motive energy (e.g., operational energy) from one or more input shafts 210, which may be coupled to motors (not pictured), to provide rotational energy to a mast 212. It should be appreciated that while only one transmission 208 is illustrated in FIG. 2, that there may be one or more transmissions 208 utilized by the UAV. The illustrated mast 212 includes a first section 214 and second section 216. In various embodiments, rotor blades (not pictured) coupled to the mast 212 may rotate in opposite directions, thereby providing a coaxial rotor having counter-rotating blades. For example, the first section 214 may rotate in a first direction 218 about an axis 220 while the second section 216 rotates in a second direction 222 about the axis 220. The illustrated UAV 200 further includes landing gear 224, which may include wheels, skids, or the like. The landing gear 224 includes landing supports 226 extending at an angle 228 toward feet 230. In the illustrated embodiment, the landing gear 224 extends outward from the frame 202 to provide a sturdy structure for landing and supporting the UAV 200.

As noted above, in various embodiments, the frame 202 includes the load support area 204, which may have improved structural strength or rigidity when compared to other components of the frame 202. For example, the load support area 204 may be formed from a different material, such as a stronger metal, composition materials, combinations of materials, or the like. Additionally, the load support area 204 may include structure reinforcements, such as cross bracing, gussets, joints, additional material or layers or material, and the like. Furthermore, in embodiments, the load support area 204 may also include one or more biasing members arranged between the load support area 204 and the remainder of the frame 202, thereby providing different harmonic properties of the load support area 204. As will be described below, in various embodiments, loads coupled to the load support area 204 may not be directed through or coupled directly to the transmission 208, which may reduce stresses or possible misalignment from the transmission 208 to improve reliability of the UAV 200. It should be noted that, because the transmission 208 is facilitating lifting of the load, that the transmission 208 will necessarily be influenced by the load. However, embodiments of the present disclosure may direct the load and an associated coupling point to the load support area 204, rather than directly to the transmission 208. Furthermore, loads may be increased due the use of the load support area 204, which may expand the operational capabilities of the UAV 200.

Figure 3:
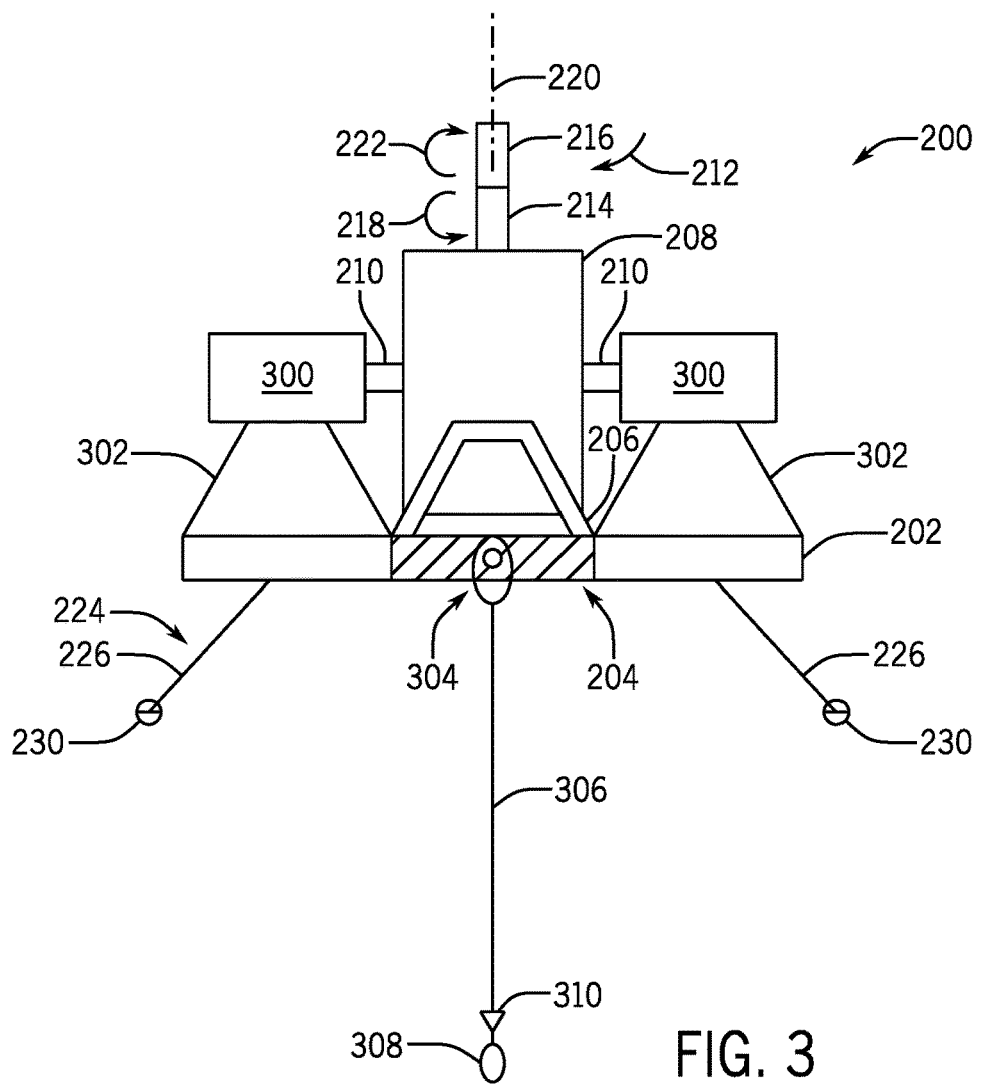
FIG. 3 is a schematic front view of an embodiment of a UAV, in accordance with embodiments of the present disclosure.

FIG. 3 is a front view of an embodiment of the UAV 200. Again, various components have been removed for clarity. The illustrated embodiment includes motors 300 (e.g., power devices) for providing motive power to the transmission 208. While the illustrated embodiment includes a pair of motors 300, it should be appreciated that any number of motors 300 may be used (e.g., 1 motor, 3 motors, 4 motors, etc.). Furthermore, in embodiments, the motors 300 may be gas powered, electric, or any other type of motor. It should be appreciated that, in various embodiments, the motors may include turbine engines that couple directly to the transmission 208, via the input shafts 210, and as a result, a 90-degree gearbox or other gearing system may not be included. Furthermore, in embodiments, the transmission 208 may include a plurality of yaw control devices for rotating the UAV in yaw about the axis 220, thereby eliminating complex differential collective yaw mechanisms. However, in various embodiments, gearing systems such as planetary gear sets and the like may be incorporated into the transmission, or separate from the transmission, to regulate operation of motor 300. Furthermore, it should be appreciated that various sensors may be incorporated to monitor operations of the motor 300, transmission 208, and the like. For example, a rotation speed of the motor, vibration, power level, and the like may be monitored.

In the illustrated embodiment, the motors 300 are coupled to the frame 200 via motor mounts 302. In various embodiments, the motor mounts 302 may further be coupled to the load support area 204. However, in the illustrated embodiment, the motor mounts 302 are positioned separate from the load support area 204.

The load support area 204 includes a mounting location 304, which may include an eyelet or the like to receive a tether 306 coupled to a load 308. As illustrated, the mounting location 304 is centered along the axis 220. However, it should be appreciated that the mounting location 304 may be positioned at any location within the load support area 204. Furthermore, there may be multiple mounting locations 304 distributed along the load support area 204 and/or the frame 202. In operation, forces generated by the load 308 are directed toward the load support area 204 and may be substantially isolated from the transmission 208 and/or the motors 300, which may improve reliability and improve lifting capacity of the UAV 200.

In various embodiments, a load location device 310 is arranged proximate the load 308. The load location device 310 may be a transceiver that sends and/or receives signals indicative of a location of the load 308. The location may be relative to the frame 202, relative to a starting location, or relative to a desired ending or transport location. For example, the load location device 310 may be utilized to navigate to the desired end location. As a result, operation may be substantially automated such that the UAV 200 may receive the load, take off, and follow prompts to transport the load 308 to an ending location based, at least in part, on signals from the load location device 310.

Figure 4:
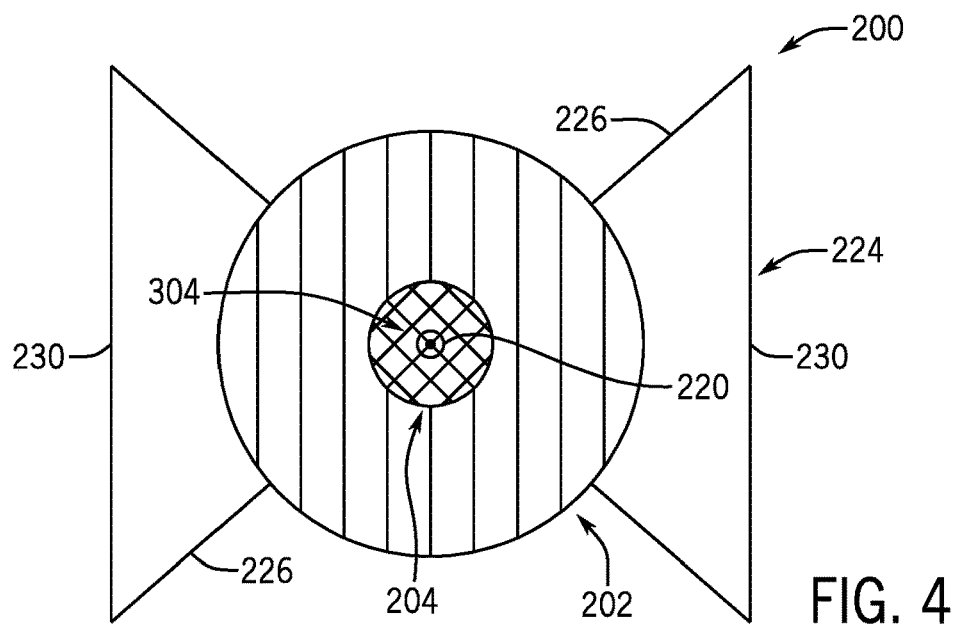
FIG. 4 is a schematic top view of an embodiment of a UAV, in accordance with embodiments of the present disclosure.

FIG. 4 is a top plan view of an embodiment of the UAV 200. As noted above, various features have been omitted for clarity with the following discussion. As shown, the landing gear 224 is arranged radially outward from the frame 202. Such an arrangement facilitates a sturdy base for the UAV 200 for landing. The illustrated landing gear 224 includes the previously discussed landing supports 226 and feed 230. As will be described below, in various embodiments, the rotor blades of the UAV 200 may extend radially outward from the landing gear 224 (e.g., having a larger outer diameter than the landing gear 224). In the illustrated embodiment, the load support area 204 is arranged within the frame 202 and has a smaller area than the totality of the frame 202. The load support area 204 is centered about the axis 220 and may include the mounting location 304 to center loads along the UAV 200. It should be appreciated that multiple mounting locations 304 may be included on the UAV 200. For example, mounting locations may be arranged at various point along the load support area 204 and/or the frame 202. In one example, the UAV 200 may include four mounting locations 304 that converge to center at the axis 220. Furthermore, in embodiments, the load may not center at the axis 220. While this may produce an uneven load, operation may be adjusted through various features of the UAV 200, such as the control system that regulates yaw, pitch, or roll control of the UAV 200. For example, in various embodiments, the load may shift during transportation and the control system may adjust various features of the UAV 200 to continue operation.

Figure 5:
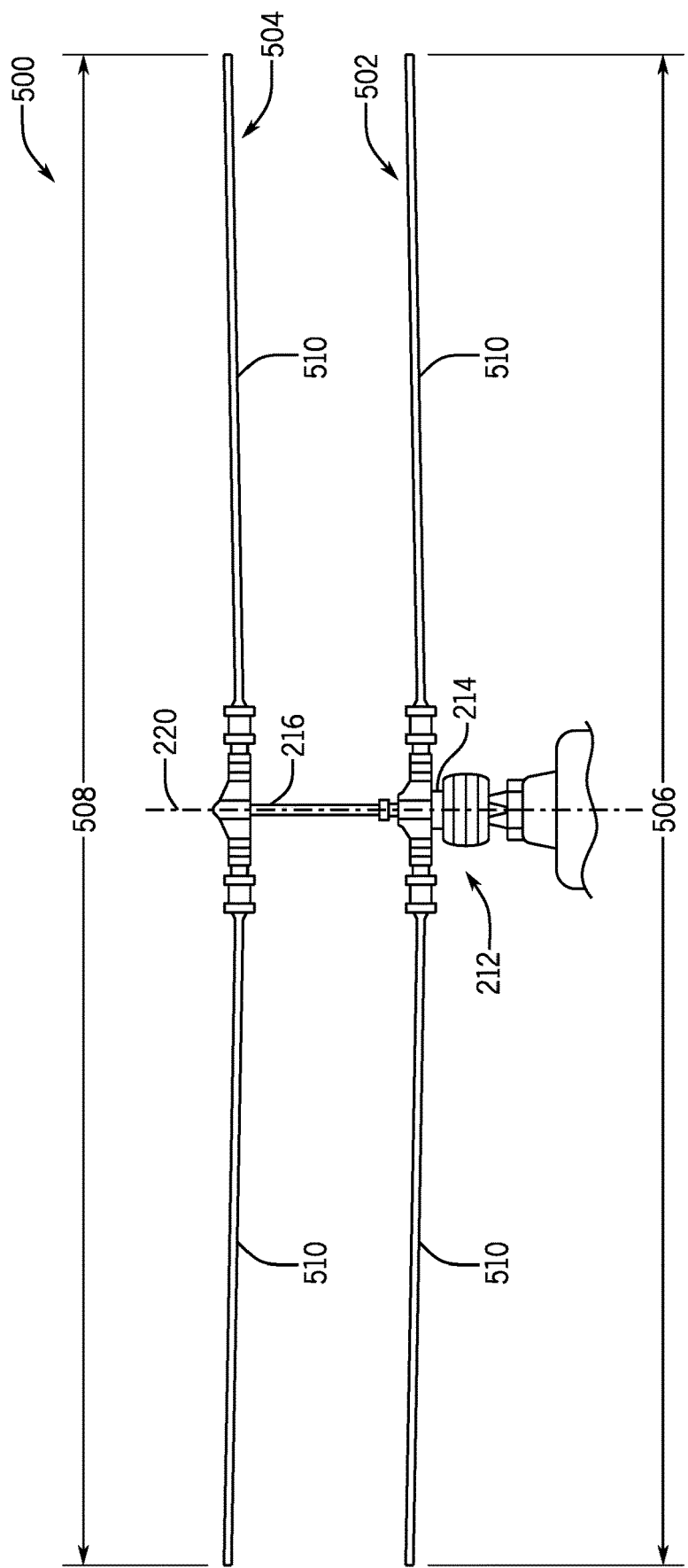
FIG. 5 is a schematic side view of an embodiment of a portion of a propulsion system of a UAV, in accordance with embodiments of the present disclosure.

FIG. 5 is a side elevational view of an embodiment of a portion of the propulsion system 500 of the UAV 200. The illustrated portion includes rotors 502, 504 coupled to the mast 212 at the first section 214 and the second section 216. It should be appreciated that the propulsion system 500 may also include the transmission 208, motors 300, and various other components. As illustrated, the rotors 502, 504 are arranged coaxially along the axis 220. In operation, the rotors 502, 504 may rotate in opposite directions, enabling generation of high amounts of lift while balancing torque effects.

It should be appreciated that respective lengths 506, 608 of the rotors 502, 504 may be particularly selected based on other dimensions of the UAV 200. For example, larger UAVs 200 may utilize larger rotors 502, 504. Furthermore, it should be appreciated that each rotor 502, 504 may be formed from a plurality of blades 510, which may also vary based on intended operating conditions.

It should be appreciated that various components of the UAV 200 may be constructed from lightweight materials in order to provide advantageous carrying capabilities. For example, the lighter the UAV 200 then the greater payload the UAV 200 may deliver. The UAV 200 may be constructed from metals, such as aluminum, steels, and the like. Furthermore, the UAV 200 may include plastics or composite materials. Additionally, combinations of materials may be used to form portions of the frame 202, load support area 204, and the like.

In various embodiments, the UAV 200 is used to transport items between a first location and a second location. The items may include containers to provide a uniform size and/or mounting location for the UAV 200. Furthermore, in embodiments, the UAV 200 may further be utilized to carry people or animals. For example, the UAV 200 may be utilized to provide extractions, such as for soldiers or for victims of environmental disasters, such as flooding or the like. Accordingly, the loads described herein may refer to containers, individual items, people, or the like.

Figure 6:
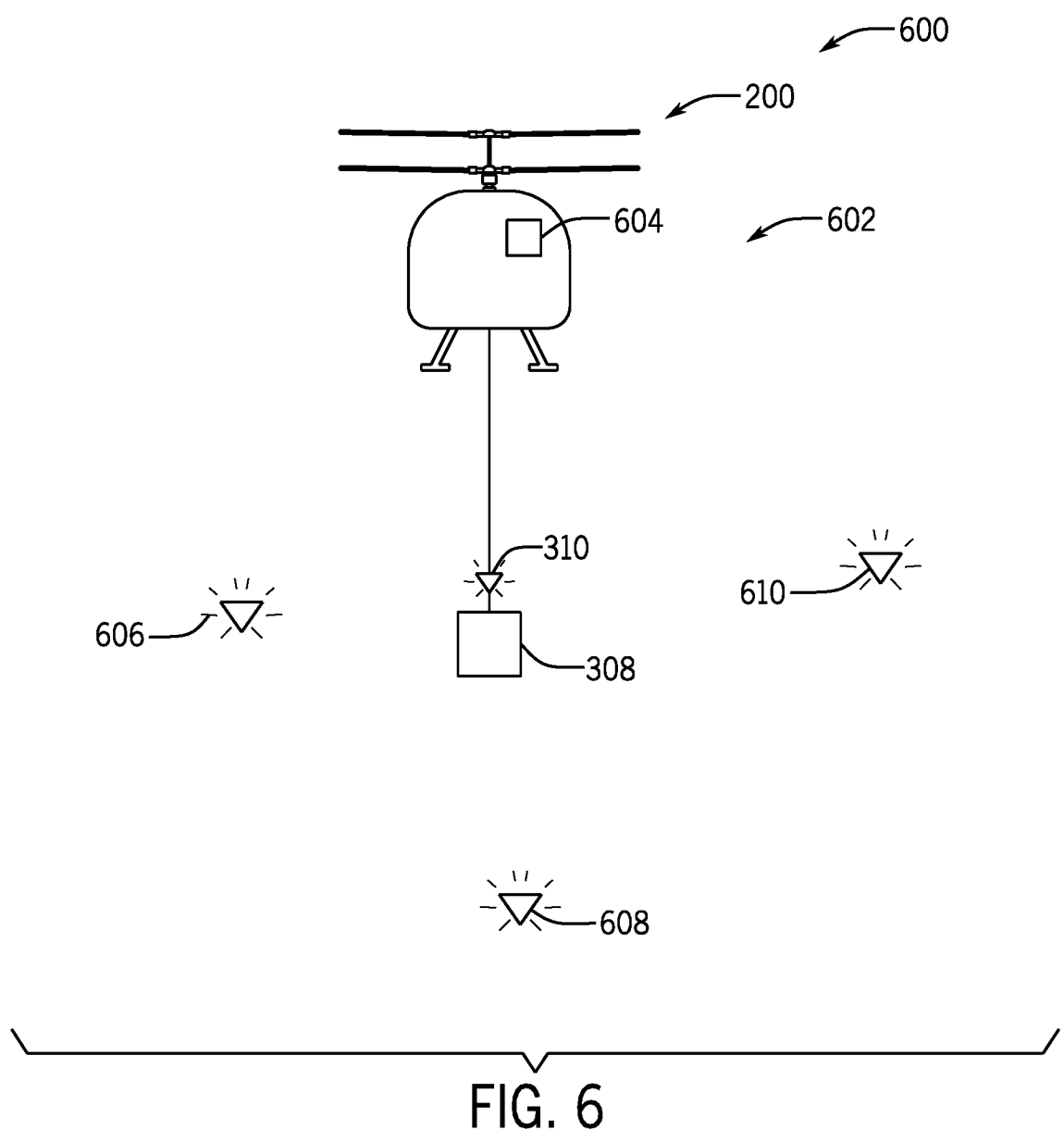
FIG. 6 is a schematic diagram of an embodiment of a UAV transmitting a load, in accordance with embodiments of the present disclosure.

FIG. 6 is a schematic illustration of an environment 600 illustrating operation of the UAV 200 via a load locating system 602. The illustrated load locating system 602 includes a load positioning controller 604, which may be positioned on the UAV 200. For example, the UAV 200 may include a mount for various electronic components, and may include a power supply, processor, memory, and the like. The load positioning controller 604 may receive signals from the load location device 310, which is arranged proximate the load 308, as described above. Furthermore, various placement location devices 606, 608, 610 are positioned at different physical locations within the environment 600. In various embodiments, each of the load location device 310 and placement location devices 606, 608, 610 may include transceivers that can send and/or receive information, for example, from the load positioning computer 604. The information may be transmitted through a variety of wireless communication protocols, such as cellular signals, near field communications signals, wireless internet signals, radio signals, and the like. For example, in various embodiments, each of the devices 310, 606, 608, 610 may be associated with a global positioning system (GPS) that provides relative locations of each of the devices 310, 606, 608, 610 with respect to one another.

In operation, the load 308 may be intended for the location associated with the placement location device 606. As a result, the load location device 310 may be specified, for example via the load positioning controller 604, for placement at the placement location device 606. Accordingly, instructions may be provided to the UAV 200, for example via the load positioning controller 604, to guide the UAV 200 toward the location associated with placement location device 606. In this manner, the load 308 may be transmitted to the desired location and may be guided toward that location. In various embodiments, the devices may have power saving features such that signals are only transmitted at intermittent times or when the load location device 310 is within a certain distance. For example, a course may be charted toward the placement location device 606, but the load location device 310 and/or the placement location device 606 may remain in a low power operating condition (or off) until the load location device 310 is within a predetermined distance from the placement location device 606. It should be appreciated that, in various embodiments, placement location devices 608, 610 may serve as beacons along the route to the placement location device 606 to provide information regarding the charted course for the UAV 200.

It should be appreciated that, in various embodiments, different modes of operation may be utilized with the load positioning controller 604. For example, a human operation may instruct the UAV 200 of the desired placement location device 606. The UAV 200 may enter an autonomous mode until the UAV 200 is within a distance of the placement location device 606. At that point, a second human operator may regain control of the UAV 200 to guide the UAV 200 to land at a desired location. It should be appreciated that, in other embodiments, the UAV 200 may be fully human operated or fully autonomous.

Figure 7:
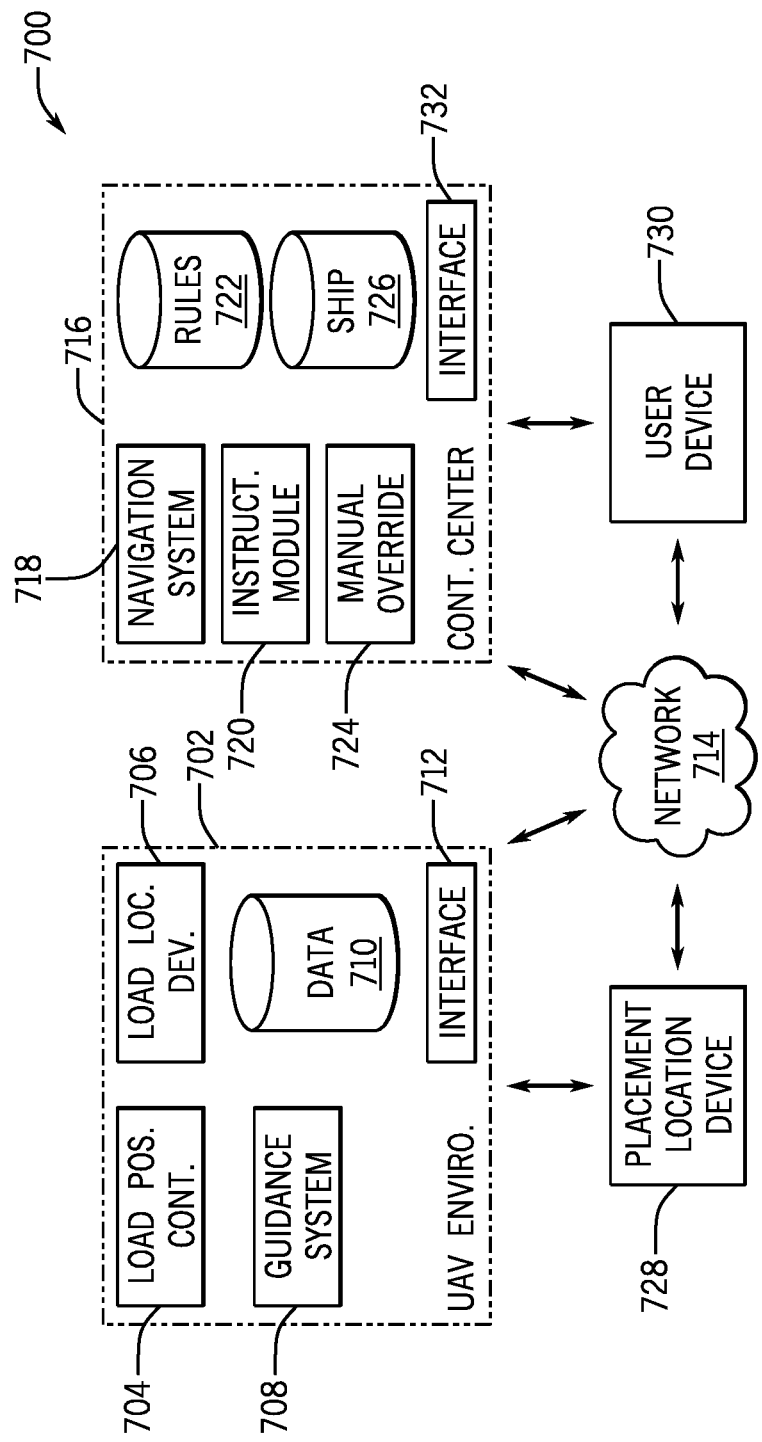
FIG. 7 is a schematic diagram of an embodiment of a control environment for a UAV, in accordance with embodiments of the present disclosure.

FIG. 7 is an example environment 700 where for embodiments of the present disclosure. In the illustrated embodiment, a UAV environment 702 includes a load positioning controller 704, which may be similar to the load positioning controller of 604. The load positioning controller 704 may determine a location of a load, for example via a load location device 706. In various embodiments, the position of the load may be with respect to the UAV, a starting location, an ending location, a mid-point beacon, or a combination thereof. In various embodiments, the load location device 706 is positioned proximate a load being transmitted by the UAV 200 and may communicate with the load positioning controller 704 via a wireless communication protocol. The UAV environment 702 further includes a guidance system 708, which may be used to navigate the UAV to a desired location. For example, the guidance system 708 may receive information from the data store 710 to navigate or otherwise control the UAV. The data store 710 may include information such as operating conditions of the engine, operating conditions of the transmission, altitude, wind speed, weather reports, regulations limiting operation of the UAV, or the like. Furthermore, in various embodiments, the data store 710 may include information to geofence the UAV within a predetermined boundary. It should be appreciated that this information may be obtained from a variety of sensors arranged along the UAV, which have not been included for simplicity. The UAV environment 700 further includes an interface 712 for communicating, via a network 714, with a control center 716. The control center 716, for example, may provide instructions to the UAV. In various embodiments, different control centers 716 may be arranged at a starting location and an ending location for the UAV. Furthermore, control centers 716 may be arranged along the path of the UAV. For example, in various embodiments the UAV may operate beyond visual line of sight (BVLS). As a result, control centers 716 may be arranged along the path or at a third location that is communicatively coupled to the UAV, but is also different than the starting location and/or the ending location. For example, the control center 716 may be a central command that transmits instructions to various UAVs. In one non-limiting example, coastal operations may utilize UAVs stationed at various locations but that are controlled from a central command that is distance from the stationed locations of the UAVs.

The illustrated control center 716 includes a navigation system 718, which may be used to plot a course for the UAV. In various embodiments, flight paths may be restricted, for example, by government entities, and as a result, the navigation system 718 may be used to determine an appropriate flight path for the UAV. The flight path may be transmitted to the UAV and may, in various embodiments, be updated during the flight to accommodate for emergency situations, weather, and the like. The control center 716 further includes an instruction module 720. The instruction module 720 may be used to transmit particular instructions to the UAV, which may be different for various different clients or loads. For example, a rules data store 722 may include different rules and regulations for various situations. By way of example only, the rules data store 722 may have altitude restrictions, weight restrictions for certain distances, and the like. As a result, flights may be planned that comply with various regulations.

The illustrated embodiment further includes a manual override 724, which may be used to take control of the UAV, for example for take offs, landings, emergency maneuvers, and the like. Furthermore, a shipment data store 726 may track different shipments to different customers, and may, in various embodiments, store different placement location devices 728 associated with particular customers and/or shipping locations. In embodiments, the placement location devices 728 may transmit signals to either the control centers 716 or the UAV environment 702, via the network 714, to facilitate placement of the loads associated with various UAVs. Furthermore, in embodiments, a user device 730 may be used to transmit instructions to the UAV environment 702 and/or the control centers 716. For example, the user device 730 may be a controller to utilize the manual override of the UAV. Additionally, the UAV may track inventory or the like at a desired location to designate where to place the load. As noted above with respect to the interface 712, communication with the control center 716 may be conducted through the interface 732.

It should be appreciated that, while various modules of the present embodiment have been illustrated as separate, that in other embodiments they may be incorporated into one another and one module may perform additional tasks. Furthermore, additional features may also be included within the various environments, such as power systems and the like. Furthermore, the data stores may not be stored locally and may be remotely accessible, for example, via a cloud system.

Furthermore, while embodiments of the present disclosure may describe multiple systems, it should be appreciated various components and/or modules may be removed in certain embodiments. For example, in an embodiment, the UAV may operate independent of a load positioning system. That is, the UAV may utilize a GPS and flight software to transport an object (or the UAV along) to a set of received coordinates. Accordingly, in various embodiments, the UAV may utilize more or fewer components. In embodiments, fewer components may reduce the costs associated with the UAV, which may be desirable to some consumers or in certain operations.

Figure 8:
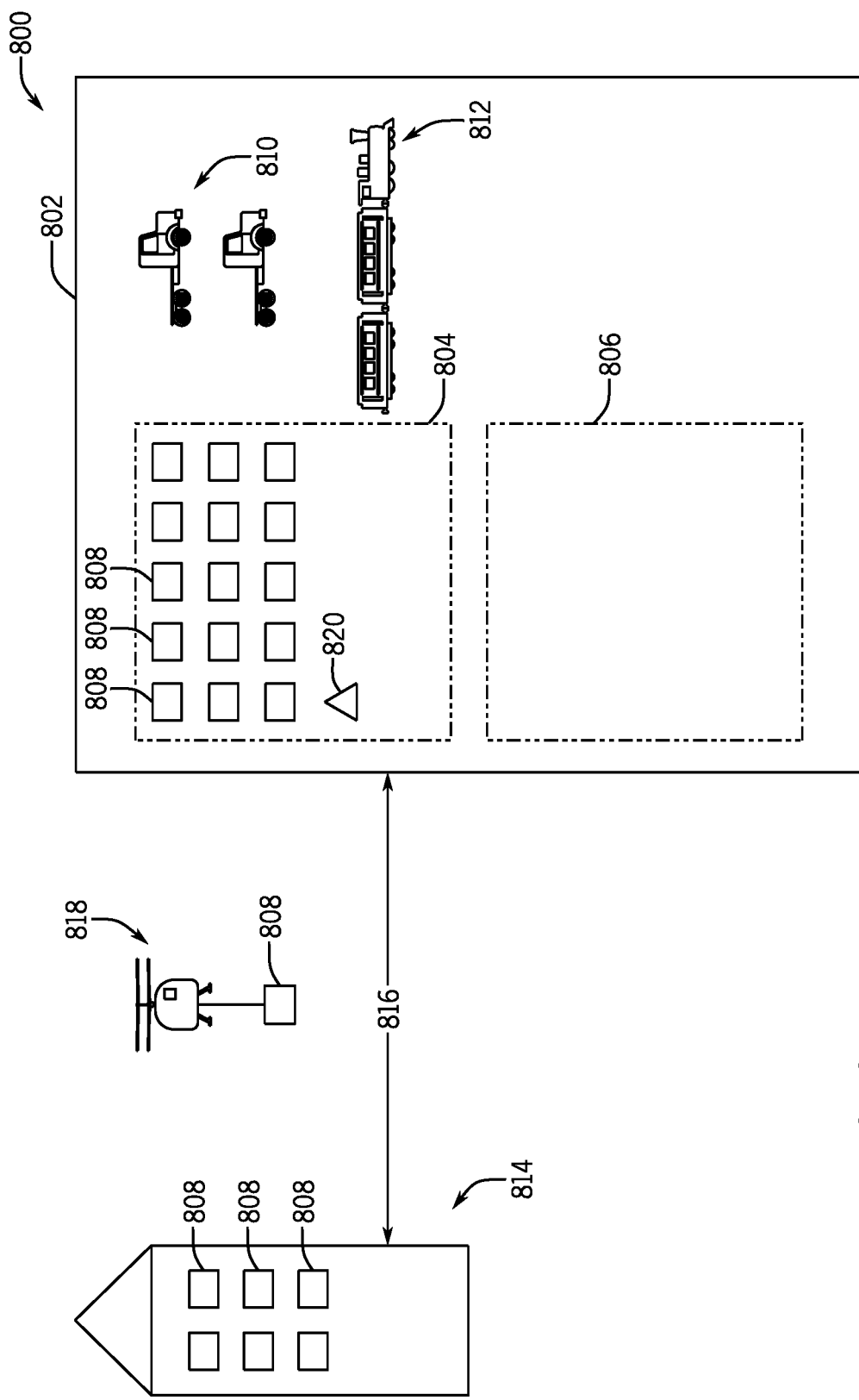
FIG. 8 is a schematic diagram of an embodiment of a staging area generated using a UAV, in accordance with embodiments of the present disclosure.

FIG. 8 is a schematic representation of an environment 800 where embodiments of the present disclosure may be utilized to form a staging area 802. In various embodiments, the staging area 802 may be utilized to replace one or more traditional facilities, which may be useful but cost prohibitive or otherwise difficult to construct. For example, it may be challenging to build new harbors, due to the depth requirements and infrastructure investments. However, many locations may have other appropriate infrastructure, such as highways and rail lines, as well as skilled labor forces, and may also be arranged close by to areas that could benefit from materials that are shipped, such as rural farming areas or industrial areas, such as oil and gas exploration operations. Moreover, military operations may benefit from being able to transport supplies to personnel arranged at beach locations, which may provide a strategic advantage, but where forming a port or other supply line may be dangerous or otherwise difficult. Furthermore, providing staging areas may be advantageous for environmental disasters, which may be difficult to reach due to damage to infrastructure, such as flooded roads or the like.

The illustrated embodiment includes the staging area 802 having a first location 804 and a second location 806. The first location 804 includes rows of storage containers 808, but it should be appreciated that other items may also be staged at the location, such as equipment, vehicles, or the like. In various embodiments, the containers 808 may be stacked or otherwise organized at the first location 804. Furthermore, any number of containers 808 may be included and the number of containers 808 in the embodiment of FIG. 8 is for illustrative purposes only. In the illustrated embodiment, the first and second locations 804, 806 are close by to other infrastructure, including roads for trucks 810 and rail line for trains 812. A ship 814 is arranged a distance 816 from the staging area 802. The ship 814 may not be able to dock at the staging area 802, for a variety of reasons, but the ship 814 may include supplies that may be advantageous to position at the staging area 802. Accordingly, embodiments of the present location may utilize a UAV 818 to transport the containers 808 from the ship 814 to the staging area 802.

In the illustrated embodiment, the UAV 818 receives the container 808 from the ship 814 and is directed toward the placement location device 820 within the first location 804. As described above, in various embodiments, operation may be autonomous, manually controlled, or semi-autonomous. For example, the UAV 818 may receive the container 808 and the location associated with the placement location device 820 may be uploaded to the UAV 818. The UAV 818 may then navigate to the location associated with the placement location device 820 to deposit the container 808. Accordingly, the staging area 802 may be established to serve as a harbor, without the infrastructure associated with the harbor, such as docks and the like. In this manner, virtually any location may be utilized as a staging area 802 to establish shipping and receiving operations.

Figure 9:
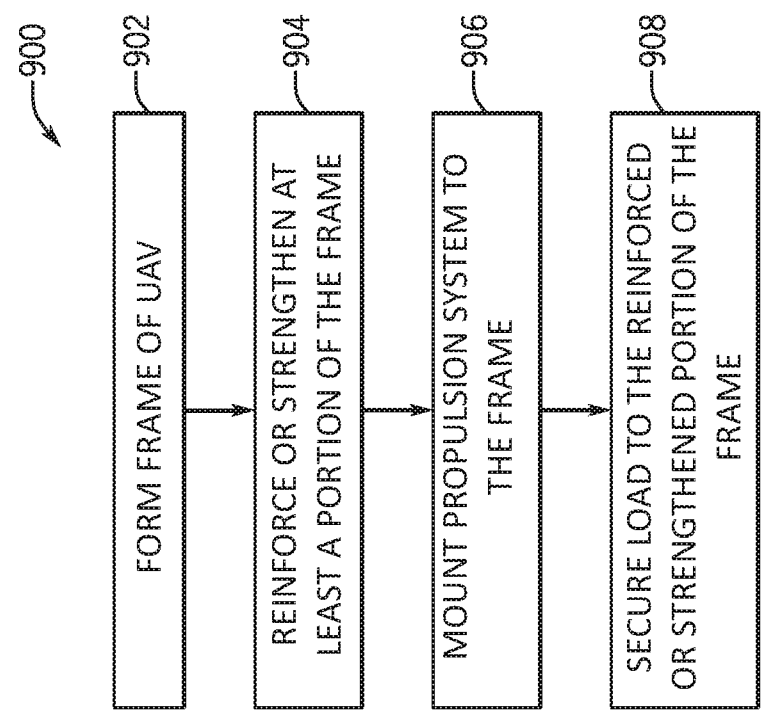
FIG. 9 is a flow chart of an embodiment of a method for forming a UAV, in accordance with embodiments of the present disclosure.

FIG. 9 is a flow chart of an embodiment of a method 900 for transporting an item via a UAV. It should be appreciated that the method may include more or additional steps. Furthermore, the steps or the method may be performed in parallel or in a different order, unless explicitly stated otherwise. The example includes forming a frame of the UAV 902. For example, the frame may be formed from a lightweight material, with sufficient strength capacity, to support various components of the propulsion system. In embodiments, at least a portion of the frame is reinforced or structurally strengthened, as described above 904. For example, the portion of the frame may receive additional gussets or strengthening materials. Furthermore, the portion of the frame that is reinforced may be formed from a different material than the rest of the frame. The propulsion system is mounted to the frame 906. For example, various mounts and the like may be utilized to secure the propulsion system to the frame to facilitate movement of the UAV. Then, the load is secured to the load support area of the frame 908. For example, the load support area may include a mounting location for receiving the load. Advantageously, securing the load to the load support area instead of the transmission or portion of the propulsion system may provide improved reliability of the propulsion system.

Figure 10:
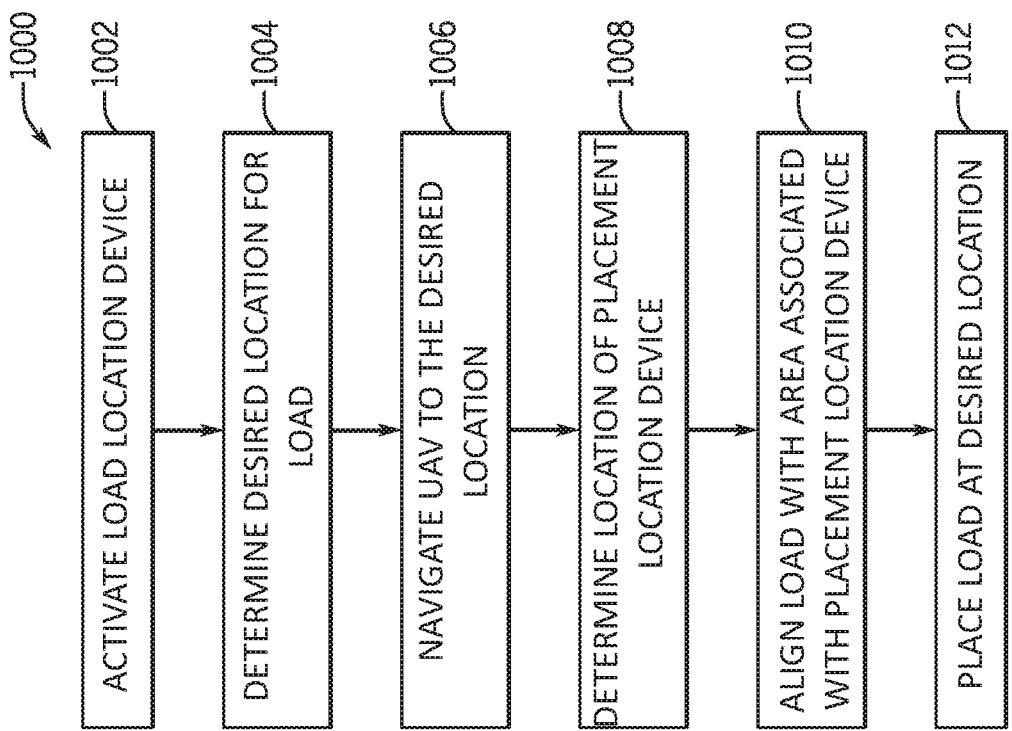
FIG. 10 is a flow chart of an embodiment of a method for controlling a UAV, in accordance with embodiments of the present disclosure.

FIG. 10 is a flow chart of an embodiment of a method 1000 for transporting a load from a first location to a second location. The example includes activating a load location device 1002. In various embodiments, the load location device determines a relative position of the load, for example relative to a desired location, a starting location, a frame of the UAV, or the like. The desired location for the load is determined 1004. The desired location may be predetermined, for example, based on a customer order or the like. The UAV is then navigated to the desired location 1006. For example, flight paths may be determined for the UAV to approximate the desired location. A position of a placement location device is determined 1008. For example, as the UAV is within a threshold distance of the placement location device, the placement location device may transmit a signal to the UAV. The load is then aligned with an area associated with the placement location device 1010. For example, the placement location device may be associated with a particular area or region. The load is then positioned at the desired location 1012. For example, the load may be positioned on the ground and decoupled from the UAV. In this manner, the load may be guided toward a desired location from a starting position.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. An unmanned aerial vehicle (UAV) for transporting items between locations, comprising:
a frame having a planar top surface, a planar bottom surface, and a constant thickness;
a propulsion system coupled to the frame, the propulsion system including at least one transmission and at least one motor, the at least one motor being horizontally mounted such that an input shaft of the at least one motor is coupled to the at least one transmission such that the input shaft is perpendicular to a mast coupled to the at least one transmission; and
a load support area integrally formed within and planar to the planar top surface and the planar bottom surface of the frame at a fixed axial position relative to the propulsion system, the load support area comprising at least one of a different material than the frame or structural supports with improved structural strength or rigidity than the frame, the load support area centered along an axis of the propulsion system, and the load support area directing a load, from the items, away from at least one of the at least one transmission and the at least one motor.

2. The UAV of claim 1, further comprising:
a mounting location located in the load support area, the mounting location for receiving a load transported by the UAV, wherein a force from the load is directed toward the load support area.

3. The UAV of claim 2, further comprising:
a second mounting location located in the load support area, wherein at least the second mounting location is not centered along the axis of the propulsion system.

4. The UAV of claim 1, further comprising:
a load location device communicatively coupled to a load positioning controller of the UAV, the load location device determining a relative location of the load coupled to the UAV, the relative location including, at least in part, a vertical offset between the items and a placement location; and
landing gear coupled to and extending outward from the frame.

5. The UAV of claim 1, wherein the propulsion system further comprises:
a first rotor, coupled to the mast, the first rotor receiving motive power from the at least one motor, the first rotor rotating in a first direction about an axis; and
a second rotor, coupled to the mast, the second rotor receiving motive power from the at least one motor, the second rotor rotating in a second direction about the axis, opposite the first direction;
wherein the at least one motor comprises at least one of a gas turbine engine, an electric motor, a gas-powered motor, or a combination thereof.

6. The UAV of claim 1, further comprising:
a transmission mount; and
a motor mount;
wherein the transmission mount is secured to the load support area and the motor mount is secured to the frame outside of the load support area, and wherein the UAV is operable in a manual operation mode, a semi-autonomous mode, or an autonomous mode.

7. The UAV of claim 1, further comprising:
a transmission mount securing the at least one transmission to the frame; and
a motor mount securing the at least one motor to the frame;
wherein the transmission mount and the motor mount are secured to the frame outside of an area defined by the load support area.

8. A system for transporting an item from a first location to a second location, comprising: an unmanned aerial vehicle (UAV), comprising: a frame; a propulsion system coupled to the frame, the propulsion system positioned on a top surface of the frame and at least one motor of the propulsion system being mounted horizontally outward from at least one transmission of the propulsion system such respective axes of the at least one transmission and the at least one motor are offset; and a load support area integrally formed within and planar to the top surface and a bottom surface of the frame at a fixed axial position relative to the propulsion system, the load support area comprising at least one of a different material with improved structural strength of rigidity than the frame or structural supports, the load support area centered along an axis of the propulsion system; a load coupled to the load support area, a force from the load directed away from one or more components of the propulsion system; and a load positioning system, comprising: a load positioning controller, associated with the UAV, the load positioning controller determining a relative position of the load with respect to at least one of the UAV, the first location, or the second location; a load location device, arranged proximate the load, the load location device transmitting a signal to the load positioning controller indicative of a load location; and a placement location device, arranged at the second location, the placement location device transmitting a signal to the load positioning controller indicative of the second location relative to the UAV.

9. The system of claim 8, wherein the placement location device transmits the signal to the load positioning controller when the UAV is within a predetermined distance of the placement location device.

10. The system of claim 8, wherein at least one of the load location device, placement location device, or load positioning controller communicate via a wireless data transmission protocol.

11. The system of claim 8, further comprising:
a control center arranged at at least one of the first location, the second location, or a third location different from the first location and the second location, the control center transmitting instructions to the UAV.

12. The system of claim 11, wherein the instructions include at least one of a flight route, coordinates of the second location, a manual override command, or operational guidelines.

13. The system of claim 8, wherein the first location is land based and the second location is water based.

14. The system of claim 8, wherein the UAV is operable in a manual operation mode, a semi-autonomous mode, or an autonomous mode.

15. The system of claim 8, further comprising:
a mounting location located in the load support area, the mounting location for receiving the load transported by the UAV; and
landing gear coupled to the frame, the landing gear including landing supports that extend at an angle from the frame such that feet of the landing gear are arranged radially outside of the frame.

16. The system of claim 8, wherein the propulsion system comprises:
at least one of a gas turbine engine, an electric motor, a gas-powered motor, or a combination thereof;
a first set of rotor blades, coupled to a mast, the first set of rotor blades rotating in a first direction about an axis; and
a second set of rotor blades, coupled to the mast, the second set of rotor blades rotating in a second direction about the axis, opposite the first direction.

17. A method for transporting an item between a first location and a second location, comprising: securing the item to a load support area of an unmanned aerial vehicle (UAV), the load support area integrally formed within and planar to a top surface and a bottom surface of a frame of the UAV, the load support area centered along an axis of a propulsion system of the UAV positioned on the top surface of the frame, the propulsion system including at least one motor and at least one transmission such that the at least one motor is mounted horizontally outward from the transmission, the at least one motor having a shaft in a perpendicular configuration with respect to a mast of the at least one transmission, and arranged at a fixed axial position relative to the propulsion system, and a force of the load is directed away from one or more components of the propulsion system via the load support area; activating a load location device, arranged proximate the item; causing the UAV to move to the second location; receiving a signal, from a placement location device, indicative of the second location; and positioning the item at the second location.

18. The method of claim 17, further comprising:
receiving a second signal, from a second placement location device, at an intermediate location between the first location and the second location.

19. The method of claim 17, further comprising:
receiving a second signal, from a control center at the second location, to switch to a manual operation mode.

20. The method of claim 17, wherein the first location is land based and the second location is water based.

* * * * *